G. F. GRIGGS & J. A. HENDERSON.
CHUCK JAW.
APPLICATION FILED MAY 16, 1911.
1,020,492.
Patented Mar. 19, 1912.
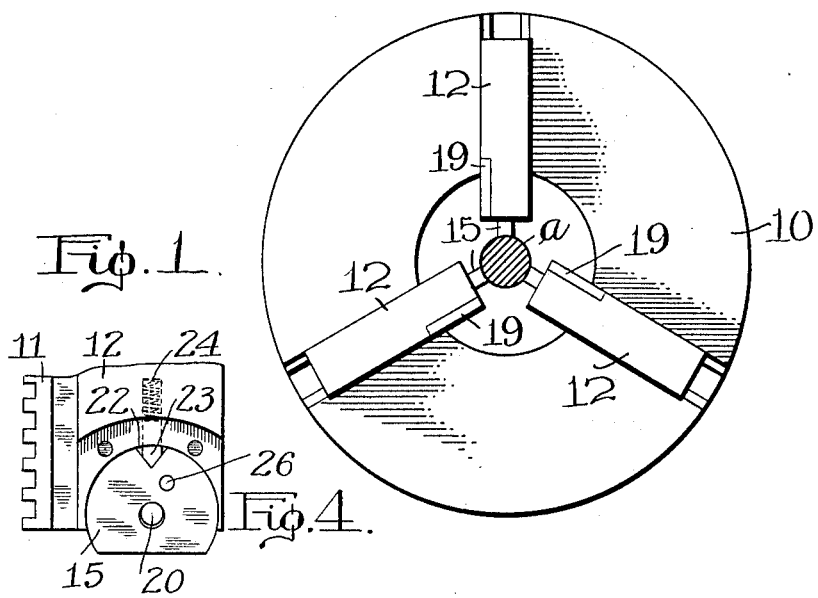
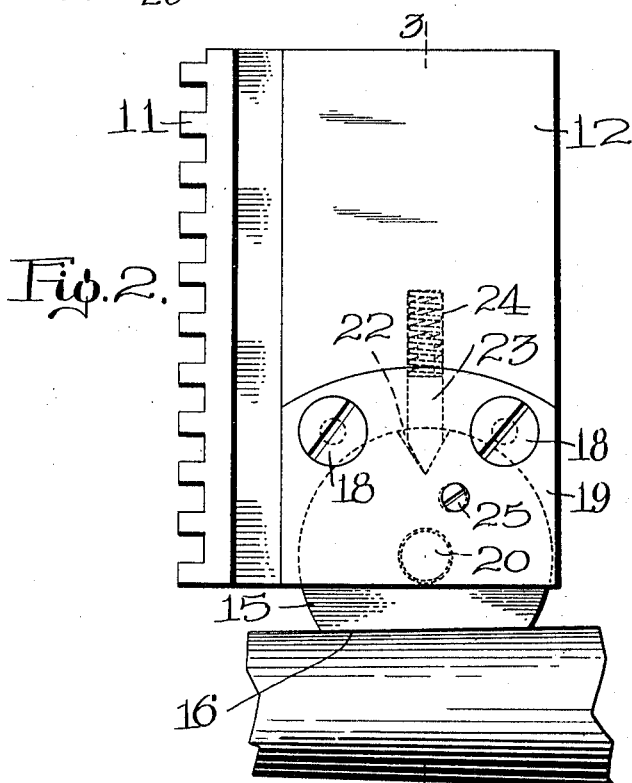
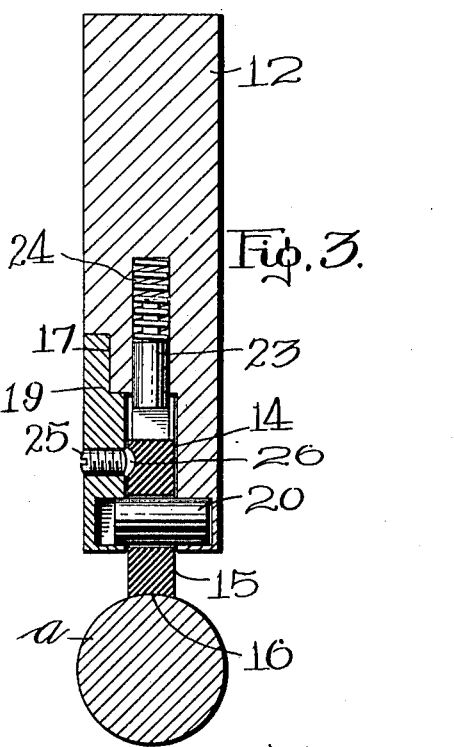
Inventors:
G. F. Griggs
J. A. Henderson
By Attorneys
Southgate & Southgate
Witnesses:
C. F. Wesson
E. M. Allen

UNITED STATES PATENT OFFICE.

GEORGE FRANKLIN GRIGGS AND JOHN A. HENDERSON, OF FITCHBURG, MASSACHUSETTS, ASSIGNORS OF ONE-THIRD TO DANIEL F. SULLIVAN AND JOHN F. McNAMARA, BOTH OF FITCHBURG, MASSACHUSETTS.

CHUCK-JAW.

1,020,492.   Specification of Letters Patent.   Patented Mar. 19, 1912.

Application filed May 16, 1911. Serial No. 627,521.

*To all whom it may concern:*

Be it known that we, GEORGE F. GRIGGS and JOHN A. HENDERSON, citizens of the United States, residing at Fitchburg, in the county of Worcester and State of Massachusetts, have invented a new and useful Chuck-Jaw, of which the following is a specification.

The principal objects of the invention are to provide a chuck jaw grip capable of general use, but particularly adapted for universal chucks, which shall be capable of turning freely on an axis so that it will be self-centering on the work and yet to provide it with a solid and firm support at the rear in all positions, whereby it will be capable of sustaining the heavy stresses and strains to which it is subjected in use; and to provide means whereby when the work is released the grip will be brought back to central position in which its clamping edge is parallel with the face of the main jaw and parallel with the axis of the work. A device of this character is particularly applicable for holding tapered work and work that is otherwise larger at one end than at the other.

Reference is to be had to the accompanying drawings, in which—

Figure 1 is a front view of a universal chuck provided with jaws in accordance with this invention; Fig. 2 is a side view of one of the jaws showing it as placed against the work; Fig. 3 is a sectional view thereof on the line 3—3 of Fig. 2, and Fig. 4 is a fragmentary view similar to Fig. 2 with the cover plate removed.

The universal chuck 10 illustrated in Fig. 1 is of a well known type, having means, (not shown) for simultaneously engaging the teeth 11 of the several jaws 12, and moving them radially at the same rate of speed. The invention is shown as applied to this type of chuck for convenience, but it is applicable to many other kinds of chucks, and in fact it can be used in various places where two or more jaws are employed to grip an article.

In the form shown each of the jaws 12 is provided with a segmental seat 14 in the edge thereof, this seat comprising somewhat more than a half circle. Located to turn in this seat is the circular grip 15 of the same diameter as the seat 14, but constituting more of the circle. It is segmental preferably and has a gripping edge 16 which can be concaved as indicated in Fig. 3 when the device is to be used for gripping cylindrical or conical objects. By this construction the grip 15, having once been inserted in the seat 14, cannot be removed therefrom by a straight pull forward as long as it is approximately in the position shown in Fig. 2. This of course is due to the fact that the seat forms more than a half circle. However, to remove it, it can be turned on its axis until the gripping surface 16 enters the seat for a distance and then it can be drawn out very easily and replaced at will, when the pivot pin 20 is not used.

A feature to which special attention is directed is the seating of the grip against the rear wall of the seat 14 throughout the extent thereof. This of course, is provided for by making the grip and rear wall of the seat of the same diameter. The result is that even with the parts made as so far described, and without the other elements shown in the drawings, the grip will work properly and yet it will have the long rear surface of the seat 14 as a solid wall for receiving the pressure put upon it. It is to be understood, of course, that when two or more of these grips are located in such a way as to clamp an object between them, they will readily turn on their own axis so as to accommodate themselves to the shape of the object. For example, if the article *a* to be clamped is conical, each of the grips will turn slightly on its axis and clamp the same throughout the length of their clamping faces 16. In this way the time required for centering an object is very materially reduced and yet the operation is performed more accurately than with ordinary types of clutch jaws, and the article is more securely clamped.

In addition to the features as described broadly above, certain others are employed preferably. In the first place the seat 14 is formed in a face of the jaw 12 and is provided with a ledge 17 along its circumference to which is secured, as by screws 18, a cover plate 19. Another feature indicated is a pivot pin 20 held by the plate 19 and the rear wall of the jaw and passing freely through the center of the grip 15. This is provided to prevent the grip falling out when turned around to a position of about 90 degrees, from that shown in Fig. 2. The pin itself is made a little smaller than the passage through the grip, or the recesses for it in the jaw, so that the pin will not receive the thrust that is being transmitted directly to the concave surface constituting the rear wall of the seat 14. It can be omitted with, of course, the omission of its function. Another feature shown consists in the provision at the rear of the grip, directly and centrally behind the operating face 16, of a V-shaped notch 22 into which projects the V-shaped end of a spring-pressed plunger 23. This plunger is seated in a passage 24 and operates radially with respect to the grip. This construction normally keeps the grip in central position with its operating edge 16 parallel with the front edge of the jaw 12, yet it will yield sufficiently to accommodate conical or other shaped pieces of work in the manner described above. A screw 25 also is shown adapted to enter a depression 26 in the face of the grip and located in position to hold it accurately in central position. This, however, is not usually required when the plunger 23 is employed, but it forms a positive means for holding the grip in central position.

The use and operation of the device will be readily understood from the description which has been given.

While we have illustrated and described a preferred embodiment of the invention, we are aware that many modifications can be made therein and that it can be used for many other purposes from that particularly shown and described without departing from the scope of the invention as expressed in the claims. Therefore we do not wish to be limited to all the details of construction or the particular use herein shown and described, but What we do claim is:—

1. As an article of manufacture, a clutch jaw having a segmental seat therein opening out of the edge and constituting more than a half circle, and a segment shaped grip of the same radius as said seat but constituting a larger part of the circle fitting said seat and free to turn therein, its straight side being outside of said seat and forming a gripping surface.

2. In a device of the character described, the combination with a main jaw having a concave seat therein opening out of one edge of the jaw and of a circular form, a grip of the same diameter as said seat located therein and projecting from it at the open edge and adapted to turn freely in the seat and to rest against the rear concave wall thereof, and yielding means for holding said grip in central position.

3. In a device of the character described, the combination with a main jaw having a concave seat therein opening out of one edge of the jaw and of a form, a grip of the same diameter as said seat located therein and projecting from it at the open edge and adapted to turn freely in the seat and to rest against the rear concave wall thereof, and positive means for holding said grip in central position.

4. In a device of the character described, the combination with a main jaw having a concave segmental seat therein opening out of one edge of the jaw, a grip of similar shape located therein and projecting from the seat at the open edge and adapted to turn freely in the seat and to rest against the rear concave wall thereof, and yielding means for holding said grip in central position, comprising a spring-pressed plunger having a tapering end movable radially with respect to said grip, the grip being provided with a V-shaped opening in its rear edge for said plunger.

In testimony whereof we have hereunto set our hands, in the presence of two subscribing witnesses.

GEORGE FRANKLIN GRIGGS.
JOHN A. HENDERSON.

Witnesses:
WALTER E. HOLDEN,
HARRY J. GARRITY.

Copies of this patent may be obtained for five cents each, by addressing the "Commissioner of Patents. Washington, D. C."